United States Patent
Buzzard et al.

(10) Patent No.: US 9,039,041 B2
(45) Date of Patent: May 26, 2015

(54) STEERING COLUMN ANTI-ROTATION PIN

(71) Applicant: Steering Solutions IP Holding Corporation, Saginaw, MI (US)

(72) Inventors: Donald A. Buzzard, Saginaw, MI (US); James C. Russell, Fairgrove, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 14/189,578

(22) Filed: Feb. 25, 2014

(65) Prior Publication Data

US 2014/0238179 A1    Aug. 28, 2014

Related U.S. Application Data

(60) Provisional application No. 61/770,738, filed on Feb. 28, 2013.

(51) Int. Cl.
*B62D 1/16*    (2006.01)
*B60R 25/02*    (2013.01)

(52) U.S. Cl.
CPC ............. *B62D 1/16* (2013.01); *Y10T 29/49826* (2015.01); *Y10T 74/20636* (2015.01)

(58) Field of Classification Search
CPC .............. B62D 1/16; Y10T 29/49826; Y10T 29/49947; B60R 25/0211; B60R 25/02113
USPC .............. 29/428, 525; 70/182, 183, 187, 252; 74/492, 493, 495, 527; 280/771, 775
See application file for complete search history.

(56) References Cited

U.S. PATENT DOCUMENTS

| | | | | |
|---|---|---|---|---|
| 3,679,244 | A * | 7/1972 | Reddy | 403/109.3 |
| 4,364,685 | A * | 12/1982 | Janz | 403/108 |
| 4,576,024 | A * | 3/1986 | Weber | 70/252 |
| 5,110,233 | A * | 5/1992 | Hoblingre et al. | 403/12 |
| 5,172,576 | A * | 12/1992 | Milton | 70/185 |
| 5,221,154 | A * | 6/1993 | Foulquier et al. | 403/12 |
| 5,564,313 | A * | 10/1996 | Hoblingre | 74/492 |
| 5,622,083 | A * | 4/1997 | Kirimoto et al. | 74/473.21 |
| 6,139,057 | A * | 10/2000 | Olgren et al. | 280/775 |
| 7,258,039 | B2 * | 8/2007 | Lin | 74/551.3 |
| 7,574,940 | B2 * | 8/2009 | Ridgway et al. | 74/492 |
| 7,735,868 | B2 * | 6/2010 | Ridgway et al. | 280/775 |
| 7,874,588 | B2 * | 1/2011 | Cymbal | 280/775 |
| 8,047,096 | B2 * | 11/2011 | Ridgway et al. | 74/493 |
| 8,627,742 | B2 * | 1/2014 | Ridgway et al. | 74/493 |
| 2006/0070484 | A1 * | 4/2006 | Kawakami | 74/527 |
| 2009/0249916 | A1 * | 10/2009 | Ridgway et al. | 74/492 |
| 2013/0319170 | A1 * | 12/2013 | Wiseley et al. | 74/552 |

FOREIGN PATENT DOCUMENTS

JP    05201364 A  *  8/1993  ............ B62D 65/00

* cited by examiner

*Primary Examiner* — Paul N Dickson
*Assistant Examiner* — Laura Freedman
(74) *Attorney, Agent, or Firm* — Cantor Colburn LLP

(57) ABSTRACT

In an embodiment of the invention, an anti-rotation assembly for a steering column is provided. The anti-rotation assembly includes a bushing and a pin having a detent for engaging the bushing when the pin is inserted into the bushing.

18 Claims, 2 Drawing Sheets

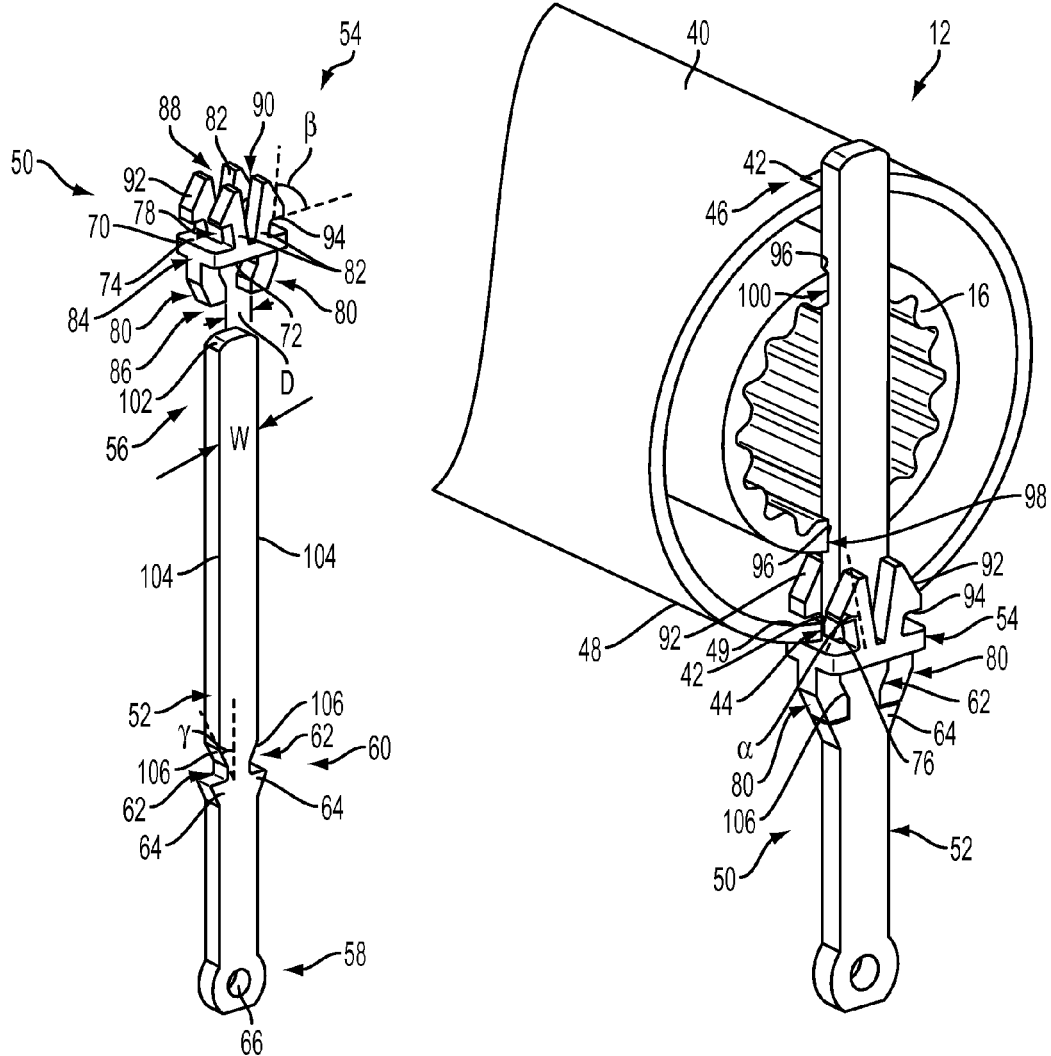

STEERING COLUMN ANTI-ROTATION PIN

CROSS-REFERENCES TO RELATED APPLICATIONS

This patent application claims priority to U.S. Provisional Patent Application Ser. No. 61/770,738, filed Feb. 28, 2013, which is incorporated herein by reference in its entirety.

FIELD OF THE INVENTION

The following description relates to an anti-rotation device, and in particular, an anti-rotation device for a steering column.

BACKGROUND OF THE INVENTION

Anti-rotation pins may be used in the automotive industry as a means of maintaining a steering shaft orientation after assembly of the steering column to a vehicle until the steering column, shaft, and driveline connections have been completed. When designing the anti-rotation pin the primary concerns are: cost, pullout effort, rotation limits, and packaging. Generally, known designs include a commonly used cylindrical pin design with an associated bushing. Such known pin assembly designs incorporate features on the pin and the bushing that act to permanently couple the two components, which creates high "push in" and/or "pull out" effort requirements when installing or removing the pin assembly. Further, some known designs may exhibit low retention qualities, which may cause the pin assembly to prematurely fall out of the column during transit or otherwise prior to final assembly of the column in the vehicle.

SUMMARY OF THE INVENTION

In an embodiment of the invention, an anti-rotation assembly for a steering column is provided. The anti-rotation assembly includes a bushing and a pin having a detent for engaging the bushing when the pin is inserted into the bushing.

In another embodiment of the invention, a steering column is provided. The steering column includes a tubular jacket comprising a wall and a first aperture extending through the jacket wall, a steering shaft oriented at least partially within the tubular jacket, the steering shaft comprising a wall and a second aperture extending through the steering shaft wall, and an anti-rotation assembly. The anti-rotation assembly extends through the first and second apertures to facilitate limiting relative rotation between the tubular jacket and the steering shaft. The anti-rotation device includes a bushing and a pin having a detent for engaging the bushing when the pin is inserted into the bushing.

In yet another embodiment of the invention, a method of assembling a steering column is provided. The method includes providing a tubular jacket comprising a wall and a first aperture extending through the jacket wall, providing a steering shaft oriented at least partially within the tubular jacket, the steering shaft including a wall and a second aperture extending through the steering shaft wall, and providing an anti-rotation assembly. The anti-rotation assembly includes a bushing and a pin having a detent for engaging the bushing. The method further includes inserting the anti-rotation assembly into the first and second apertures to facilitate limiting relative motion between the tubular jacket and the steering shaft.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is an exploded view of the anti-rotation assembly shown in FIG. 2; and FIG. 4 is a cross-sectional view of the steering column shown in FIG. 2 taken along line 4-4 with the anti-rotation assembly inserted therein.

DETAILED DESCRIPTION

Figure 1:
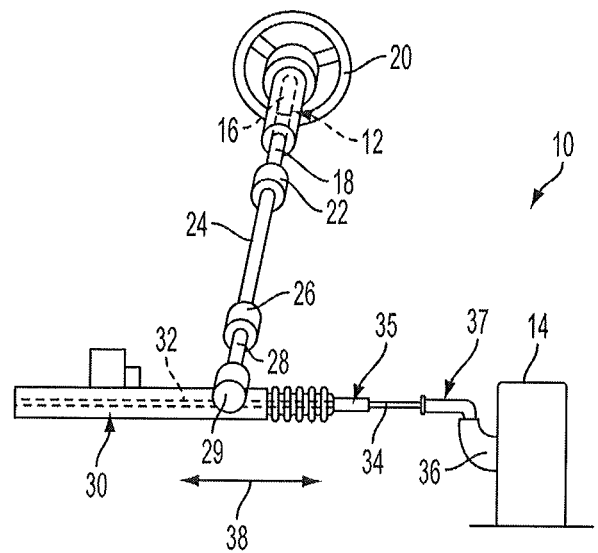
FIG. 1 is a schematic illustration of a steering system according to an exemplary embodiment of the present invention.

Referring now to the Figures, where the invention will be described with reference to specific embodiments, without limiting same, FIG. 1 illustrates a steering system 10 for use in a vehicle (not shown). Steering system 10 enables the operator of the vehicle to control the direction of the vehicle through the manipulation of a steering column 12, which is mechanically connected to road wheels 14 (only one shown). Steering column 12 includes an upper column shaft 16 and a lower column shaft 18. A hand wheel 20 is disposed at upper column shaft 16 and is positioned so that the operator can apply a rotational force to steering column 12. A column universal joint 22 couples lower column shaft 18 to an intermediate shaft 24, which is secured at its other end to a lower column universal joint 26. A pinion shaft 28 is coupled at one end to universal joint 26 and to a pinion gear 29 of a steering gear assembly 30 at the other end. Gear assembly 30 also includes an elongate rack 32, and the opposed axial ends of rack 32 are coupled to the vehicle's road wheels 14 through steering linkage that includes tie rods 34 (only one shown) each secured to rack 32 at an inner tie rod end 35, and to one of a pair of steering knuckles 36 (only one shown) at an outer tie rod end 37.

When the vehicle operator turns hand wheel 20, a rotational force is applied to steering column 12 and pinion gear 29 is accordingly rotated. The movement of pinion gear 29 causes axial movement of rack 32 in the direction of arrows 38, which in turn manipulates tie rods 34 and knuckles 36 in order to reposition road wheels 14. Accordingly, when hand wheel 20 is turned, pinion gear 29 and a matching tooth portion (not shown) convert rotary motion of hand wheel 20 into linear motion of rack 32. In order to assist the operator-applied force to steering system 10, a motor (not shown) may be energized to provide power assist to the movement of rack 32, thereby aiding in the steering of the vehicle.

Figure 2:
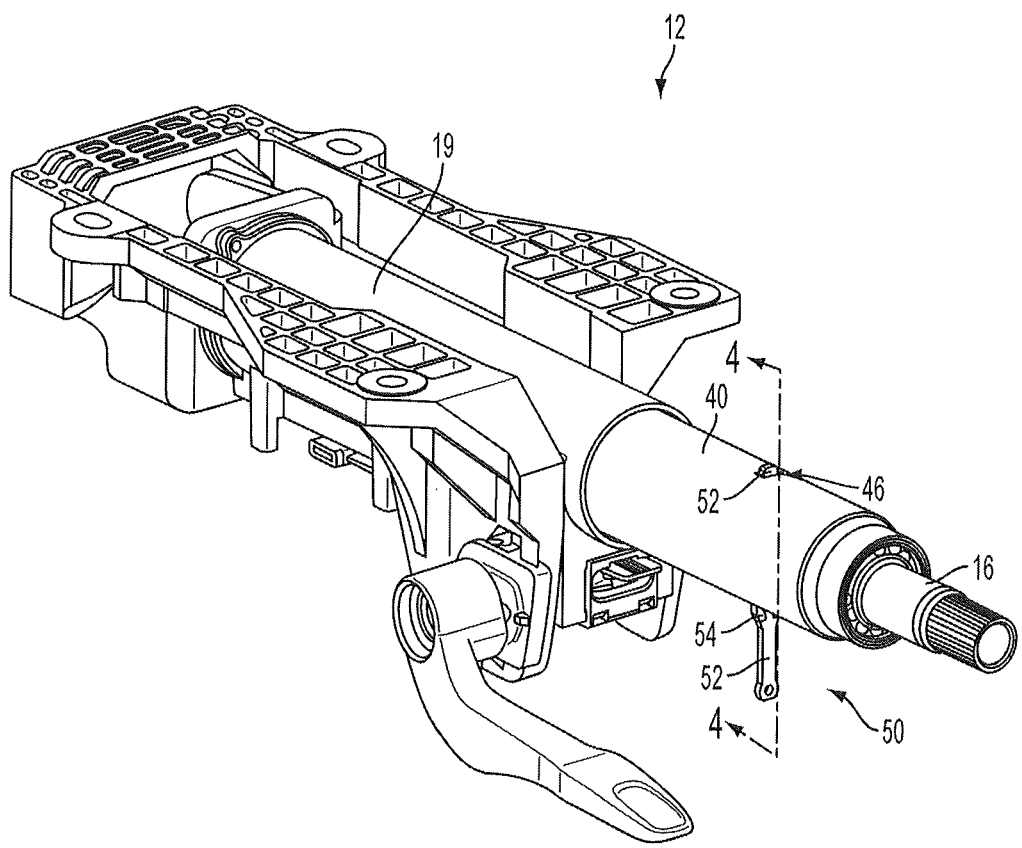
FIG. 2 is a perspective view of an exemplary steering column that may be used with the steering system shown in FIG. 1 and that includes an anti-rotation assembly according to an exemplary embodiment of the present invention.

FIGS. 2-4 illustrate an exemplary anti-rotation device or assembly 50 that facilitates maintaining the orientation of exemplary steering column 12 during assembly of steering column 12 to the vehicle. As shown in FIGS. 2 and 4, steering column 12 includes an upper jacket 40, which receives upper column shaft 16 therein, and anti-rotation assembly 50 extends through upper jacket 40 and upper shaft 16 to maintain orientation and prevent relative rotation therebetween, as described herein in more detail. Alternatively, device 50 may extend through lower shaft 18 and a lower jacket 19.

In the exemplary embodiment, anti-rotation assembly 50 generally includes a pin 52 and a retaining bushing or element 54.

With further reference to FIG. 3, pin 52 includes a first end 56, a second end 58, and an engagement portion 60, which includes opposed notches or detents 62 and opposed stop tabs 64. In the exemplary embodiment, pin 52 is stamped from flat stock and includes a rectangular cross-section. Alternatively, pin 52 may have any cross-sectional shape that enables anti-rotation assembly 50 to function as described herein. Additionally, pin second end 58 may include an aperture 66 extending therethrough for attachment of an object (not shown) to aid in the removal of device 50 from steering column 12 (e.g., a zip tie).

Retaining bushing 54 includes a main body 70 having opposed sides 72 and 74 and an inner wall 76 defining an aperture 78 extending through main body 70. Bushing 54 also includes opposed retractable tabs 80 extending from first side 72, and a plurality of retention tabs 82 extending from second side 74. Retractable tabs 80 includes proximal ends 84 coupled to first side 72 and distal ends 86 that extend inwardly towards each other. Second side 74 includes a first pair 88 of opposed retention tabs 82 oriented on one side of bushing aperture 78 across from a second pair 90 of opposed retention tabs 82. Although illustrated with four retention tabs 82, retaining bushing may have any suitable number of tabs 82 that enables anti-rotation assembly 50 to function as described herein. In the exemplary embodiment, each retention tab 82 includes an insertion face 92 and a retention face 94.

With further reference to FIG. 4, upper jacket 40 includes inner walls 42 defining opposed anti-rotation pin openings 44 and 46. Similarly, shaft 16 includes inner walls 96 defining opposed anti-rotation pin openings 98 and 100. During assembly of steering column 12, pin first end 56 is inserted from bushing first side 72 through bushing aperture 78, which has a shape complementary to pin 52 such that pin 52 only fits into aperture 78 in two orientations (i.e., at 0° and 180° of rotation). Alternatively, one or more of the four retention tabs 82 may have an offset height which allows bushing 54 to be assembled at 0° or 180°.

A width 'W' of pin 52 is larger than a distance 'D' between retractable tab distal ends 86 such that retractable tabs 80 must flex outwardly away from each other in order to insert pin 52 into bushing 54. Tapered or rounded pin edges 102 facilitate flexing retractable tabs 80 outward away from each other around pin side edges 104 and pin 52 is inserted into bushing 54 until retractable tabs 80 reach pin detents 62. At this point, retractable tabs 80 retract inward towards each other into respective detents 62, and pin 52 is prevented from further insertion into bushing aperture 78 when retractable tab distal ends 86 contact pin stop tabs 64. Width W, distance D, and the angular orientation of tapered/rounded pin edges 102 are variable to provide a desired amount of force to insert pin 52 into bushing 54 between retractable tabs 80.

Once bushing 54 is snapped or attached to pin 52, pin first end 56 is inserted in sequence through pin opening 44, pin opening 98, pin opening 100, and pin opening 46. In the exemplary embodiment, pin openings 44, 46, 98, 100 are slotted. Alternatively, pin openings 44, 46, 98, 100 may have any suitable shape that enables anti-rotation assembly 50 to function as described herein.

As retaining bushing 54 passes into pin opening 44, retention tab insertion faces 92 contact inner wall 42 and retention tabs 82 are flexed inward toward the other tab of pair 88, 90 to enable retention tabs 82 to pass through pin opening 44. Once insertion faces 92 pass inner wall 42 of pin opening 44, retention tabs 82 flex outward away from the other tab of pair 88, 90. In the exemplary embodiment, insertion faces 92 are oriented at an angle 'α' (FIG. 4), which is tunable (i.e., variable) to establish a desired "push in" force to insert anti-rotation device 50 into steering column 12. For example, as angle 'α' is increased, the force required to flex retention tabs 82 inward to pass through pin opening 44 is increased, and vice versa.

Anti-rotation assembly 50 is properly coupled to steering column 12 once pin 52 extends through pin openings 44, 46, 98, 100 and retention tabs 82 flex back outward. At this point, bushing main body second side 74 facilitates preventing further insertion of anti-rotation assembly 50 through pin opening 44 due to second side 74 abutting against an outer surface 48 of jacket 40. Similarly, retention tab retention faces 94 facilitate preventing removal of bushing 54 from pin opening 44 due to retention faces 94 abutting against an inner surface 49 of jacket 40. In the exemplary embodiment, retention faces 94 are oriented at an angle 'β' (e.g., 90°; FIG. 3) such that bushing 54 becomes permanently fixed to steering column 12. Further, the four-corner orientation of retention tabs 82 facilitates preventing rotation of bushing 54 within pin opening 44.

In the exemplary embodiment, pin 52 is first inserted into bushing 54 to form anti-rotation assembly 50. Anti-rotation assembly 50 is then inserted into steering column 12, for example, on an assembly line. Alternatively, bushing 54 may first be assembled to upper jacket 40 as described above, and then pin 52 is subsequently inserted into bushing 54 and steering column 12, for example, on the assembly line.

Once anti-rotation assembly 50 is assembled and seated as shown in FIGS. 2 and 4, the relative orientation between upper shaft 16 and upper jacket 40 is maintained to facilitate assembly of steering column 12 to a vehicle. Once steering column 12 is coupled to the vehicle, pin 52 may be pulled out of steering column 12 and bushing 54 to enable steering column 12 to transmit rotational torque from hand wheel 20 to road wheels 14. As such, when removing pin 52 from steering column 12 and anti-rotation assembly 50, retractable tabs 80 contact pin removal surfaces 106, which facilitate flexing retractable tabs 80 outward away from each other around pin side edges 104. Subsequently, pin 52 is then removed from bushing 54. In the exemplary embodiment, removal surfaces 106 are oriented at an angle 'γ' (FIG. 3), which is tunable (i.e., variable) to establish a desired "pull out" force to remove pin 52 from bushing 54. For example, as angle 'γ' is increased, the force required to flex retractable tabs 80 outward to remove pin 52 is increased, and vice versa.

Systems and methods for anti-rotation assemblies are described herein. The anti-rotation assembly includes a separate pin and bushing. The bushing includes features to permanently couple the bushing to a steering column and additional features to removably couple the pin to the bushing. The assembly incorporates a stamped pin versus the current cylindrical pin design which has machined bushing retention features. In addition, the assembly addresses "pull out" effort requirements by altering the bushing design to allow the bushing the ability to maintain a secure and rattle free position in the steering column when the pin component is removed. The assembly thus eliminates "push in" and "push out" concerns by eliminating the removal requirement of the bushing.

Having thus described the invention, it is claimed:

1. An anti-rotation assembly for a steering column, the anti-rotation assembly comprising:
   a bushing comprising a main body having an inner wall defining an aperture extending through said main body; and
   a pin extending through said aperture, said pin having a detent for engaging said bushing when said pin is inserted into said bushing, and
   after installation of said anti-rotation assembly in said steering column, said pin is removable from said bushing and said steering column such that said bushing remains within said steering column.

2. The assembly of claim 1, wherein said pin is non-cylindrical.

3. The assembly of claim 1, wherein said bushing further comprises at least one retractable tab extending from said main body and configured to engage said pin detent.

4. The assembly of claim 1, wherein said bushing further comprises at least two retention tabs extending from said main body and configured to engage a steering column jacket.

5. The assembly of claim 4, wherein said at least two retention tabs comprises a first pair of opposed retention tabs and a second pair of opposed retention tabs.

6. The assembly of claim 4, wherein each retention tab of said at least two retention tabs includes a retention surface configured to engage the jacket and facilitate preventing removal of said bushing from said jacket when said pin is removed from said bushing.

7. The assembly of claim 1, wherein said main body includes a first surface and an opposed second surface, said bushing further comprising:
   retractable tabs extending outwardly from said first surface, said retractable tabs configured to engage said pin detent; and
   retention tabs extending outwardly from said second surface in a direction away from said first surface, said retention tabs configured to engage a steering column jacket.

8. The assembly of claim 7, wherein said retractable tabs have distal ends extending toward each other.

9. The assembly of claim 7, wherein said retention tabs have distal ends extending away from each other.

10. The assembly of claim 1, wherein said pin has a rectangular cross-section.

11. A steering column comprising:
   a tubular jacket comprising a wall and a first aperture extending through said jacket wall;
   a steering shaft oriented at least partially within said tubular jacket, said steering shaft comprising a wall and a second aperture extending through said steering shaft wall; and
   an anti-rotation assembly extending through said first and second apertures to facilitate limiting relative rotation between said tubular jacket and said steering shaft, said anti-rotation assembly comprising:
      a bushing; and
      a pin having a detent for engaging said bushing when said pin is inserted into said bushing, and
      said pin is removable from said bushing and said first and second apertures such that said bushing remains within said first aperture.

12. The steering column of claim 11, wherein said pin is non-cylindrical.

13. The steering column of claim 11, wherein said bushing comprises at least one retractable tab configured to engage said pin detent.

14. The steering column of claim 11, wherein said bushing comprises at least two retention tabs configured to engage said tubular jacket.

15. The steering column of claim 14, wherein said at least two retention tabs comprises a first pair of opposed retention tabs and a second pair of opposed retention tabs.

16. The steering column of claim 14, wherein each retention tab of said at least two retention tabs includes a retention surface configured to engage said tubular jacket and facilitate preventing removal of said bushing from said tubular jacket when said pin is removed from said bushing.

17. A method of assembling a steering column, the method comprising:
   providing a tubular jacket comprising a wall and a first aperture extending through the jacket wall;
   providing a steering shaft oriented at least partially within the tubular jacket, the steering shaft including a wall and a second aperture extending through the steering shaft wall;
   providing an anti-rotation assembly including a bushing and a pin having a detent for engaging the bushing;
   inserting the anti-rotation assembly into the first and second apertures to facilitate limiting relative motion between the tubular jacket and the steering shaft; and
   removing, after said step of inserting the anti-rotation assembly, the pin from the bushing and the first and second apertures such that the bushing remains within the first aperture.

18. The method of claim 17, further comprising inserting the pin into the bushing such that the bushing engages the pin detent.

* * * * *